(12) United States Patent
Liu

(10) Patent No.: US 10,375,307 B2
(45) Date of Patent: Aug. 6, 2019

(54) METHOD AND ELECTRONIC DEVICE FOR ACQUIRING PANORAMIC IMAGE

(71) Applicant: Lenovo (Beijing) Co., Ltd., Beijing (CN)

(72) Inventor: Xiaoqing Liu, Beijing (CN)

(73) Assignee: LENOVO (BEIJING) CO., LTD., Beijing (CN)

( * ) Notice: Subject to any disclaimer, the term of this patent is extended or adjusted under 35 U.S.C. 154(b) by 0 days.

(21) Appl. No.: 15/815,036

(22) Filed: Nov. 16, 2017

(65) Prior Publication Data

US 2018/0288321 A1 Oct. 4, 2018

(30) Foreign Application Priority Data

Mar. 31, 2017 (CN) .......................... 2017 1 0209544

(51) Int. Cl.
*G06T 1/00* (2006.01)
*H04N 5/232* (2006.01)
*G06T 3/40* (2006.01)

(52) U.S. Cl.
CPC ....... *H04N 5/23238* (2013.01); *G06T 1/0007* (2013.01); *G06T 3/4038* (2013.01); *H04N 5/23293* (2013.01); *G06T 2207/10004* (2013.01)

(58) Field of Classification Search
CPC ............ G06T 1/007; G06T 3/4038; G06T 2207/1004; H04N 5/23238
USPC ....................................................... 396/296
See application file for complete search history.

(56) References Cited

U.S. PATENT DOCUMENTS

| 7,711,262 | B2 * | 5/2010 | Park | G03B 37/00 348/39 |
| 2003/0151659 | A1 * | 8/2003 | Kawano | H04N 13/021 348/42 |
| 2004/0189849 | A1 * | 9/2004 | Hofer | G03B 37/04 348/333.03 |
| 2007/0253698 | A1 * | 11/2007 | Park | G03B 37/00 396/296 |

(Continued)

FOREIGN PATENT DOCUMENTS

| CN | 101010942 A | 8/2007 |
| CN | 101377615 A | 3/2009 |
| CN | 101377616 A | 3/2009 |

(Continued)

*Primary Examiner* — Clayton E. LaBalle
*Assistant Examiner* — Linda B Smith
(74) *Attorney, Agent, or Firm* — Anova Law Group, PLLC

(57) ABSTRACT

A method for acquiring a panoramic image includes controlling a display screen of an electronic device to display a viewfinder frame and a direction indicator that indicates a movement direction for the electronic device, acquiring and processing a first image to obtain a first progress indicator, arranging the first progress indicator on a first side of and close to the viewfinder frame, acquiring and processing a second image to obtain a second progress indicator, arranging the second progress indicator on the first side of and close to the viewfinder frame and moving the first progress indicator away from the viewfinder frame, acquiring and processing a third image to obtain a third progress indicator, and arranging the third progress indicator on the first side of and close to the viewfinder frame and arranging the first progress indicator on a second side of and away from the viewfinder frame.

16 Claims, 10 Drawing Sheets

(56) References Cited

U.S. PATENT DOCUMENTS

2012/0105682 A1* 5/2012 Hata ................. H04N 5/23238
                                                         348/239
2017/0324898 A9* 11/2017 Karunamuni .......... G03B 37/02

FOREIGN PATENT DOCUMENTS

| | | |
|---|---|---|
| CN | 101902571 A | 12/2010 |
| CN | 102917167 A | 2/2013 |
| CN | 103227903 A | 7/2013 |
| CN | 103685956 A | 3/2014 |
| CN | 104145474 A | 11/2014 |
| CN | 104902183 A | 9/2015 |

* cited by examiner

METHOD AND ELECTRONIC DEVICE FOR ACQUIRING PANORAMIC IMAGE

CROSS-REFERENCES TO RELATED APPLICATIONS

This application claims priority to Chinese Patent Application No. 201710209544.2, filed on Mar. 31, 2017, the entire contents of which are hereby incorporated by reference.

TECHNICAL FIELD

The present disclosure generally relates to the field of image processing and, more particularly, to a method and an electronic device for acquiring a panoramic image.

BACKGROUND

As the quality of life improves, people's requirements on photographing effects grows increasingly. For example, people may want to use either a camera or an electronic device carrying a camera to take wide-format photos or large-angle or 360-degree panoramic photos. Such panoramic photos can display richer content and improve the visual effect. However, currently, when photographing and merging images from different angles into a wide-format photo or obtaining large-angle or 360-degree panoramic photos, the user needs to, with help of markers, perform operations based on his or her experience/intuition, shoot corresponding photos at different angles, and eventually combine the obtained photos into a panoramic photo. Such method is not flexible, the image-processing procedure is not visualized, and the user experience can be relatively poor.

BRIEF SUMMARY OF THE DISCLOSURE

One aspect of the present disclosure provides a method for acquiring a panoramic image. The method includes controlling a display screen of an electronic device to display a viewfinder frame and a direction indicator that indicates a movement direction for the electronic device, acquiring a first image and processing the first image to obtain a first progress indicator, and arranging the first progress indicator on a first side of and close to the viewfinder frame. The method further includes acquiring a second image and processing the second image to obtain a second progress indicator, and arranging the second progress indicator on the first side of and close to the viewfinder frame and moving the first progress indicator away from the viewfinder frame. The method also includes acquiring a third image and processing the third image to obtain a third progress indicator, and arranging the third progress indicator on the first side of and close to the viewfinder frame and arranging the first progress indicator on a second side of and away from the viewfinder frame. The first side is opposite to the second side.

Another aspect of the present disclosure provides an electronic device for acquiring a panoramic image. The electronic device includes a camera, a processor coupled to the camera, and a display screen coupled to the processor. The processor controls the display screen to display a viewfinder frame and a direction indicator that indicates a movement direction for the electronic device, acquires a first image and processes the first image to obtain a first progress indicator, arranges the first progress indicator on a first side of and close to the viewfinder frame, acquires a second image and processes the second image to obtain a second progress indicator, arranges the second progress indicator on the first side of and close to the viewfinder frame and moves the first progress indicator away from the viewfinder frame, acquires a third image and processing the third image to obtain a third progress indicator, and arranges the third progress indicator on the first side of and close to the viewfinder frame and arranges the first progress indicator on a second side of and away from the viewfinder frame. The first side is opposite to the second side.

Other aspects of the present disclosure can be understood by those skilled in the art in light of the description, the claims, and the drawings of the present disclosure.

BRIEF DESCRIPTION OF THE DRAWINGS

In order to more clearly illustrate technical solutions in embodiments of the present disclosure, drawings for describing the embodiments are briefly introduced below. Obviously, the drawings described hereinafter are only some embodiments of the present disclosure, and it is possible for those ordinarily skilled in the art to derive other drawings from such drawings without creative effort.

In the accompanying drawings, the reference numerals denote corresponding parts throughout:
1—Camera
2—Processor
3—Display screen
4—Determining unit
5—Movement instructing unit
6—Viewfinder frame
7—Photographing button
8—Process bar
9—Cellphone
10—First indicator
11—Memory

DETAILED DESCRIPTION

Figure 1:
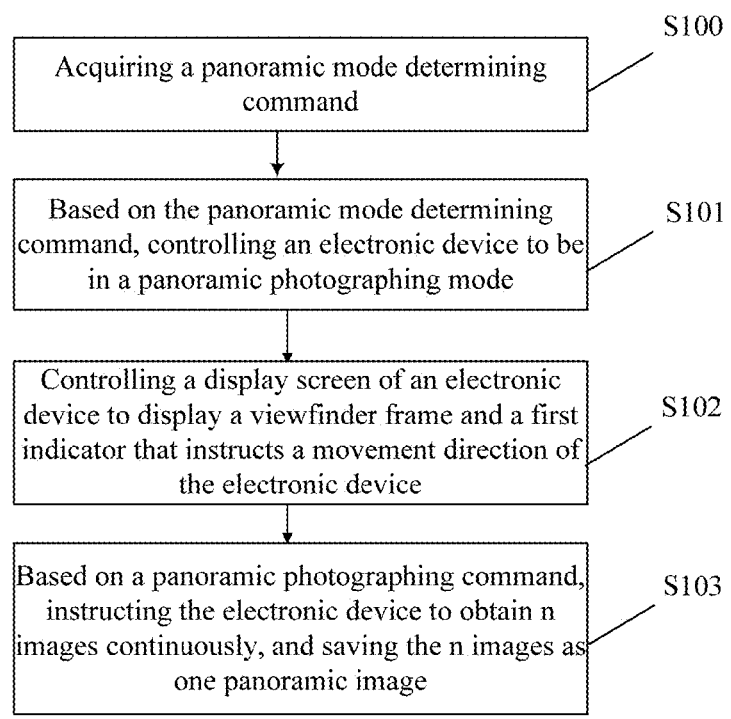
FIG. 1 illustrates a flow chart of an example of method for acquiring a panoramic image.

Various aspects and features of the present disclosure will be described hereinafter with reference to the accompanying drawings. It should be understood that, various modifications may be made to the disclosed embodiments. Thus, the specification shall not be construed as limiting, but is merely intended to illustrate examples of the embodiments. Other modifications obtainable by those skilled in the relevant art shall all fall within the scope and spirit of the present specification.

Accompanying drawings included in the specification and forming a part of the specification are for illustration of embodiments of the present disclosure, and together with the aforementioned summary section of the present disclosure as well as the detailed description section of the present disclosure provided herein, the accompanying drawings explain the principles of the present disclosure.

Through descriptions of embodiments given as non-limiting examples, the above-described and other features of the present disclosure will become obvious.

It should be further understood that, although the present disclosure is described with reference to some specific embodiments, those skilled in the relevant art may still implement many other equivalent manners, which possess features described in the appended claims and shall fall within the protection scope defined herein.

Reference will be made to accompanying drawings, and based on the following detailed illustrations, the foregoing and other aspects, features, and advantages of the present disclosure will become apparent.

Specific embodiments of the present disclosure will be illustrated in detail hereinafter; however, it should be understood that, the disclosed embodiments are only examples of the present disclosure and may be implemented using various manners. Well-known and/or repeated functions and structures are not described in detail to avoid unnecessary or redundant details that obscure the present disclosure. Thus, the specific structural and functional details disclosed by this paper are not intended to be limiting, but are used as basis of the claims and representative basis for teaching those skilled in the relevant art that, in nature, any appropriate structure may be applied to diversely implement the present disclosure The terms "in one embodiment," "in another embodiment," "in an additional embodiment," "in some embodiments," "in some other embodiments," and "in other embodiments" applicable in the present specification may refer to one or more the same or different embodiments of the present disclosure.

The present disclosure provides a method for acquiring a panoramic image. The method may enable a corresponding electronic device, e.g., a digital camera or a cellphone equipped with a camera, to be capable of photographing and generating panoramic images. It should be noted that, the panoramic image often displays a scene covering 90 degree to 360 degree (columnar panorama) onto a two-dimensional plane, thereby showing the front, the back, the left, and the right of the single scene to the observer.

FIG. 1 illustrates a flow chart showing an example of method for acquiring a panoramic image consistent with the present disclosure. The method is described in more detail below.

S100: acquiring a panoramic mode determining command. The determining command may be sent by the electronic device, and may be triggered in an automatic manner or a manual manner. For example, a user may manually trigger the panoramic mode determining command by pressing a corresponding button, e.g., a shutter button or a photographing button of the electronic device, or by utilizing a corresponding application program, thereby allowing the electronic device to receive the panoramic mode determining command.

Figure 4:
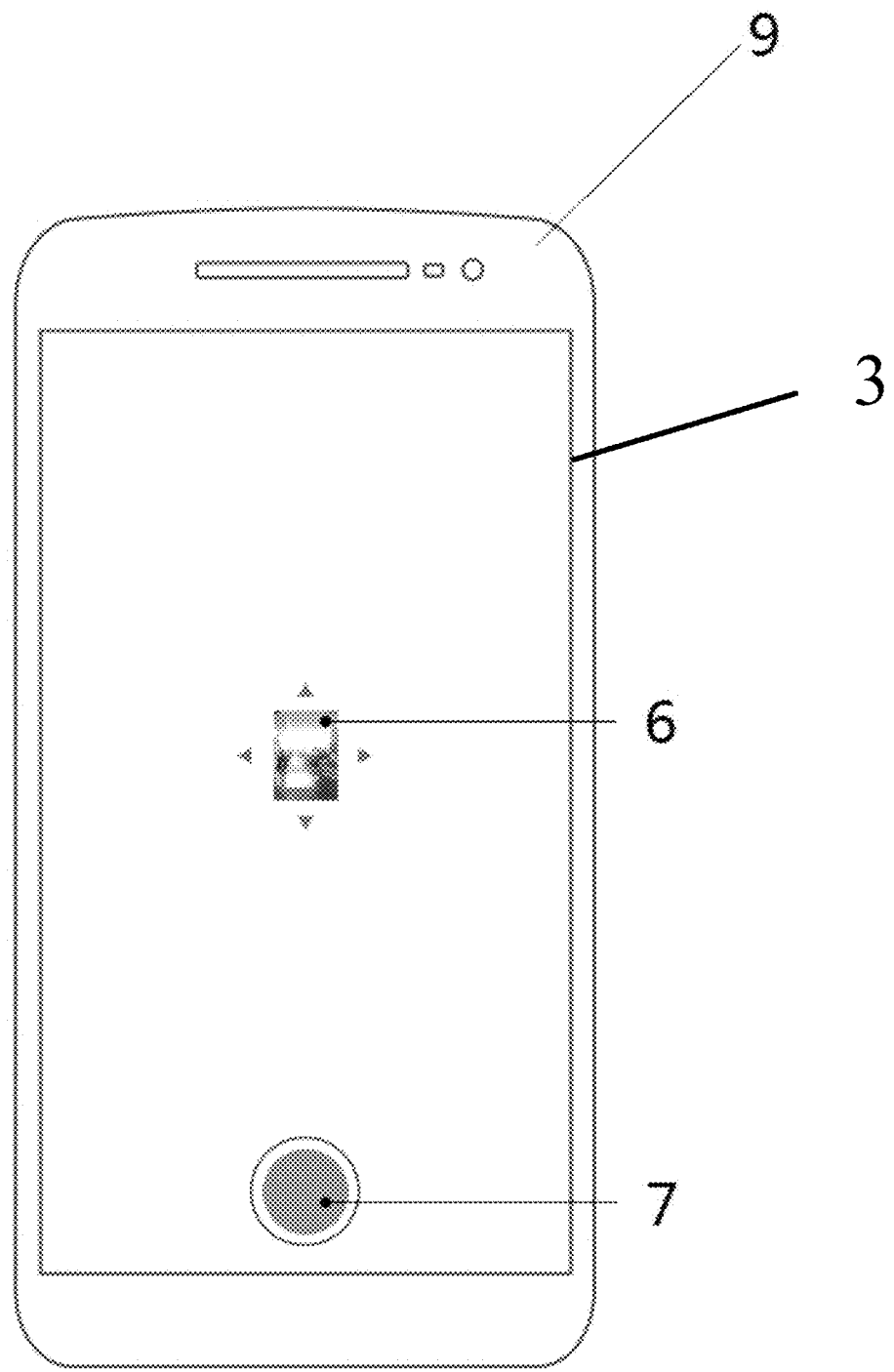
FIG. 4 illustrates a schematic view of an electronic device at a stage during acquiring a panoramic image.

FIG. 4 illustrates a schematic view of an electronic device at a stage during acquiring a panoramic image. As shown in FIG. 4, before acquiring the panoramic mode determining command, the electronic device, e.g., a cellphone 9, may be in a photographing preview mode. In the photographing review mode, a display screen 3 of the cellphone 9 may include a viewfinder frame 6 (also referred to as a "preview window") for displaying a reduced current view, and a photographing button 7.

In some embodiments, in the photographing review mode, the viewfinder frame 6 may be located at or near a central position of the display screen, and the photographing button 7 may have a shape of two concentric circles with the inner circle showing a color different from the outer circle. In the photographing view mode, the photographing button 7 may have other shapes or colors, and the present disclosure is not limited thereto.

In some embodiments, in the photographing preview mode, the display screen 3 of the cellphone 9 may further include four indicators surrounding the viewfinder frame 6 for indication of directions, and the four indicators may be triangle arrows arranged above, below, to the right, and to the left of the viewfinder frame 6, respectively. In some embodiments, in the photographing preview mode, the display screen 3 of the cellphone 9 may include the photographing button 7, but not the viewfinder frame 6 and the four direction indicators.

Further, when the user presses the photographing button 7, the panoramic mode determining command is triggered, and the cellphone 9 receives the triggered panoramic mode determining command. In one embodiment, the shape or color of the photographing button 7 may be changed to indicate that the panoramic mode determining command is triggered.

S101: based on the panoramic mode determining command, controlling the electronic device to be in a panoramic photographing mode for shooting a panoramic image. That is, in the panoramic photographing mode, the electronic device may utilize system resources to prepare for photographing a panoramic image.

Figure 9:
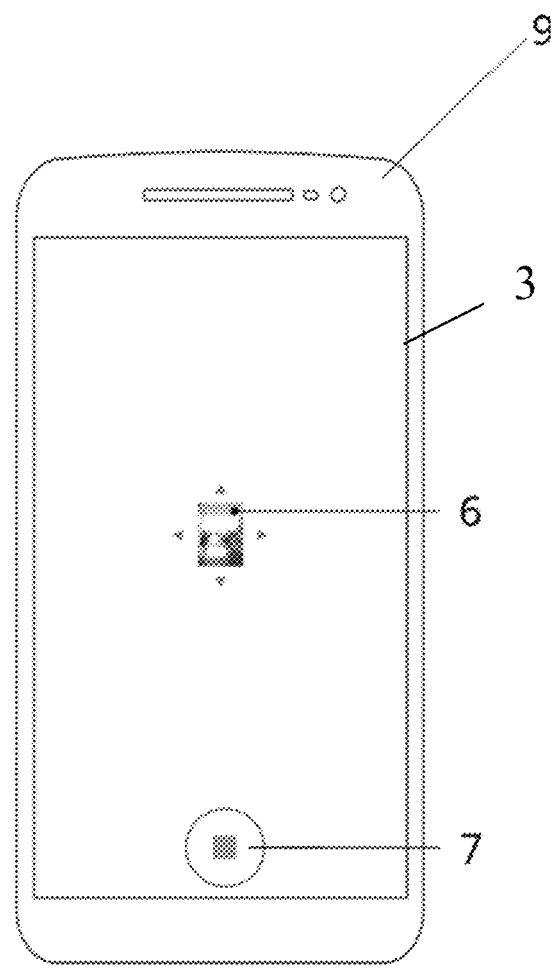
FIG. 9 illustrates a schematic view of a display screen in a panoramic photographing mode in an electronic device consistent with the disclosure.

FIG. 9 illustrates a schematic view of a display screen of an electronic device under the panoramic photographing mode consistent with the disclosure. As shown in FIG. 9, upon receiving the panoramic mode determining command, the electronic device, e.g., the cellphone 9, may be controlled to be in a panoramic photographing mode. In the panoramic photographing mode, the photographing button 7 may include a circle having a solid square in the center, indicating that the system is ready for shooting a panoramic image.

S102: in the panoramic photographing mode, controlling the display screen of the electronic device to display a viewfinder frame and a first indicator that instructs a movement or rotation direction of the electronic device. The viewfinder frame is also referred to as a "preview window," and the first indicator is also referred to as a "direction indicator." In some embodiments, the first indicator may be a direction indicator disposed close to the viewfinder frame that indicates one or more directions the electronic device can move or rotate along for shooting a panoramic image.

Figure 5:
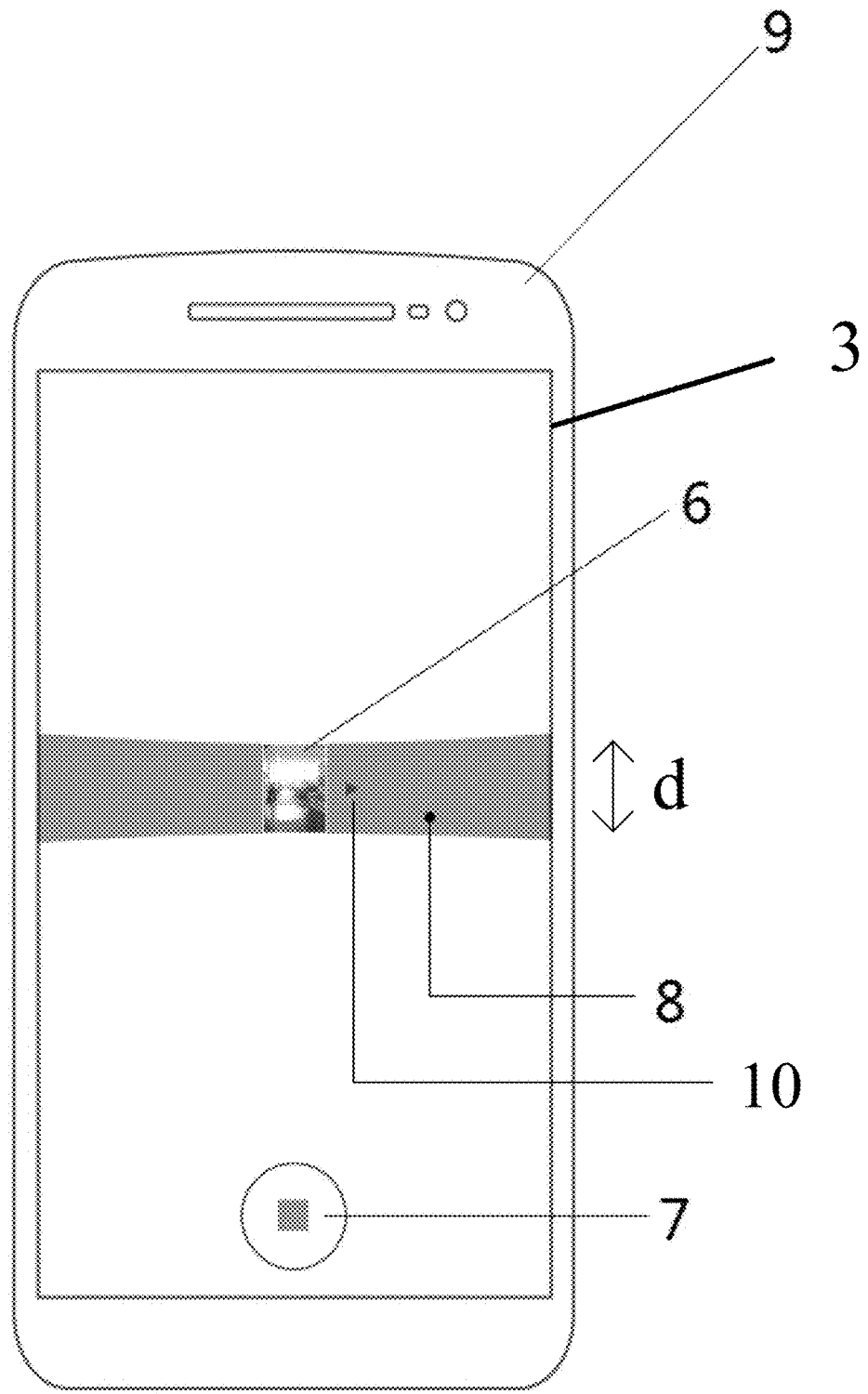
FIG. 5 illustrates a schematic view of the electronic device at another stage during acquiring the panoramic image.

For example, FIG. 5 illustrates a schematic view of the electronic device at a stage during acquiring a panoramic image in the panoramic photographing mode. As shown in FIG. 5, in the panoramic photographing mode, the display screen 3 of the cellphone 9 is controlled to display the viewfinder frame 6, and a first indicator 10. In some embodiments, a process bar 8 may be configured on the left side and right side of the viewfinder frame 6 on the display screen 3, and the photographing button 7 may also be displayed. For example, the photographing button 7 may be displayed on the bottom region of the display screen 3.

In some embodiments, the viewfinder frame 6 may be configured at a central position of the display screen 3, and the location of the viewfinder frame 6 may remain substantially unchanged as the electronic device moves or rotates. The viewfinder frame 6 may display an image currently being shot or to be shot for browsing purposes by the user. Further, the first indicator 10 may include, for example, a solid arrow or another indication sign arranged to the left or right of the viewfinder frame 6, for suggesting the electronic device moving along a certain direction to shoot or acquire more images. In another embodiment, the first indicator 10 may include two arrows for instructing the user to rotate or move the electronic device to the left or right to acquire more images.

In another example, the first indicator 10 may include four solid triangle arrows configured around the viewfinder frame 6 for indicating the movement directions of the electronic device, and each arrow indicates one of the upwards, downwards, leftwards, and rightwards directions to instruct the user to rotate or move the electronic device in one direction and obtain more images during the rotation and moving process.

Further, in some embodiments, the acquired images may be placed in the process bar 8 that is configured on the left and right sides of the viewfinder frame 6. Referring to FIG. 5, the process bar 8 may have the greatest width denoted by the letter "d" at the rightmost and leftmost edges of the display screen 3 and gradually decreased width towards the viewfinder frame 6 of the display screen 3. Further, the sizes of the acquired images may be configured to fit the process bar 8 appropriately. That is, the top and bottom edges of the acquired images may coincide with the top and bottom edges of the process bar 8, respectively.

In some embodiments, the shape of the process bar 8 may be rectangular. That is, the width "d" of the process bar 8 may be substantially unchanged from the left edge to the right edge of the display screen. The sizes of the acquired images may or may not be configured to exactly fit the process bar 8. Other shapes of the process bar 8 may exist and the sizes of the acquired images may be adjusted based on actual demands, and the present disclosure is not limited thereto.

S103: acquiring a panorama photographing command. The panorama photographing command instructs the electronic device to acquire a set of n images consecutively and save the set of n images as one panoramic image, where n is a positive integer. That is, the electronic device can be configured to acquire the set of n images consecutively and save the set of n images into one panoramic image based on the panorama photographing command.

In some embodiments, in the process of acquiring the set of n images, the electronic device may shoot one image every time it rotates for a certain angle, such that the set of n images may be obtained after the electronic device is rotated for n times.

In some other embodiments, to acquire the set of n images, the electronic device may move linearly and shoot one image every certain interval, such that the set of n images may be obtained after the electronic device moves for n times.

The set of n images may be stitched together based on a corresponding acquisition sequence. For example, the right edge of an mth image may be stitched with the left edge of an (m+1)th image, where m is an integer and 0<m<n. Further, the set of n stitched images may be saved as one panoramic image.

Figure 2:
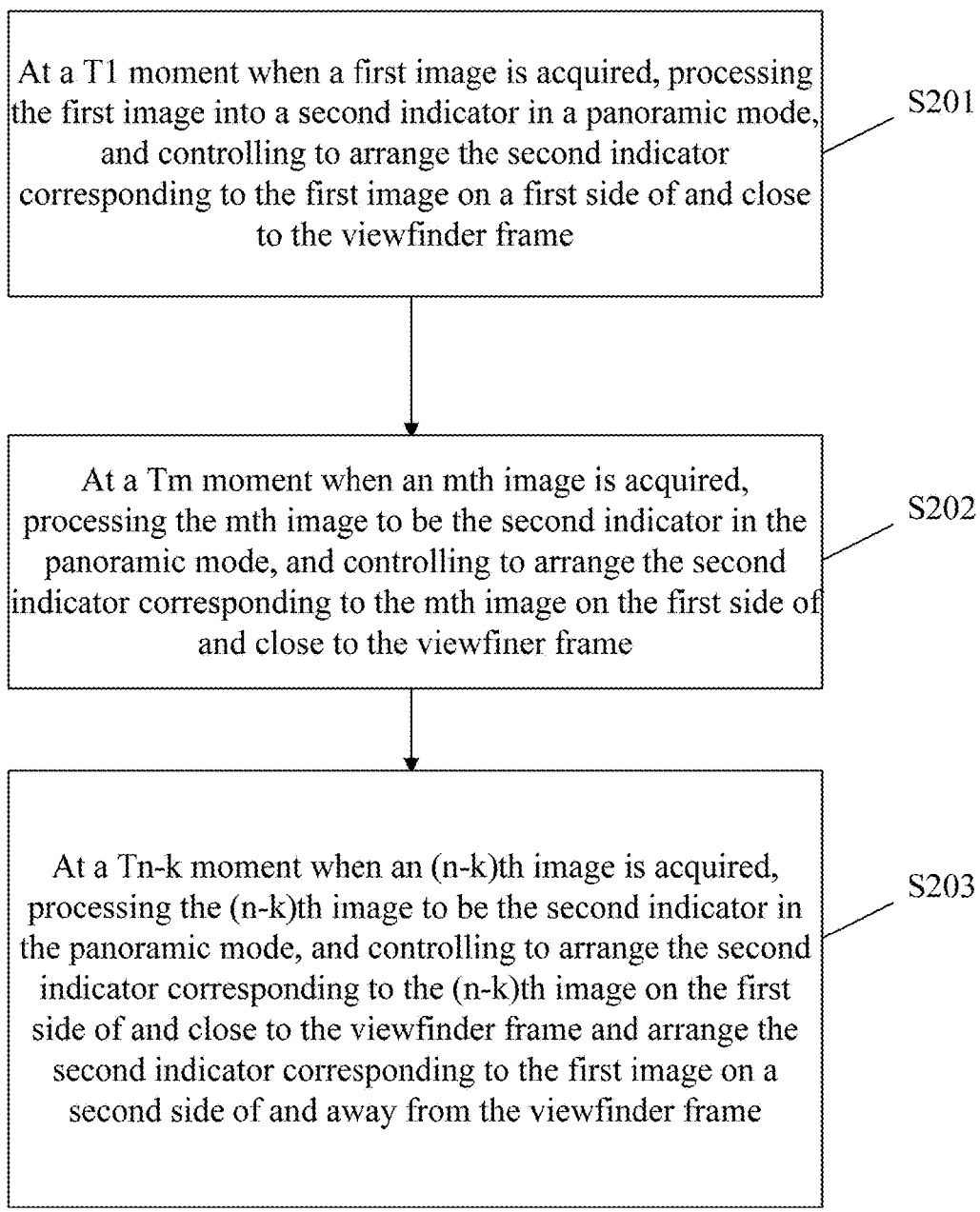
FIG. 2 illustrates a flow chart of an example of process in response to a panorama photographing command.

FIG. 2 shows a flow chart of an example of process responding to the panorama photographing command. As shown in FIG. 2, at S201, at a moment T1 when the first image is acquired, the first image is processed to be a second indicator in the panoramic mode. Processing an image, such as the first image, to be a second indicator may refer to, for example, creating the second indicator based on the first image. The second indicator is also referred to as a "progress indicator." The second indicator may be displayed in various forms for representing the photographing and processing processes of the images, e.g., a generating process of the panoramic image from the beginning.

For example, on a first side of and close to the viewfinder frame 6, the second indicator corresponding to the first image is controlled to be arranged. For example, on the left side of the viewfinder frame 6 located in the central region of the display screen 3 of the electronic device, the first image is gradually displayed, and the visual effect displayed by the electronic device includes showing the gradual movement of the first image from the left edge of the viewfinder frame 6 till the right edge of the first image coincides with the left edge of the viewfinder frame 6. As such, the second indicator corresponding to the first image can indicate the photographing process, and can prompt for photographing the second image.

Figure 6:
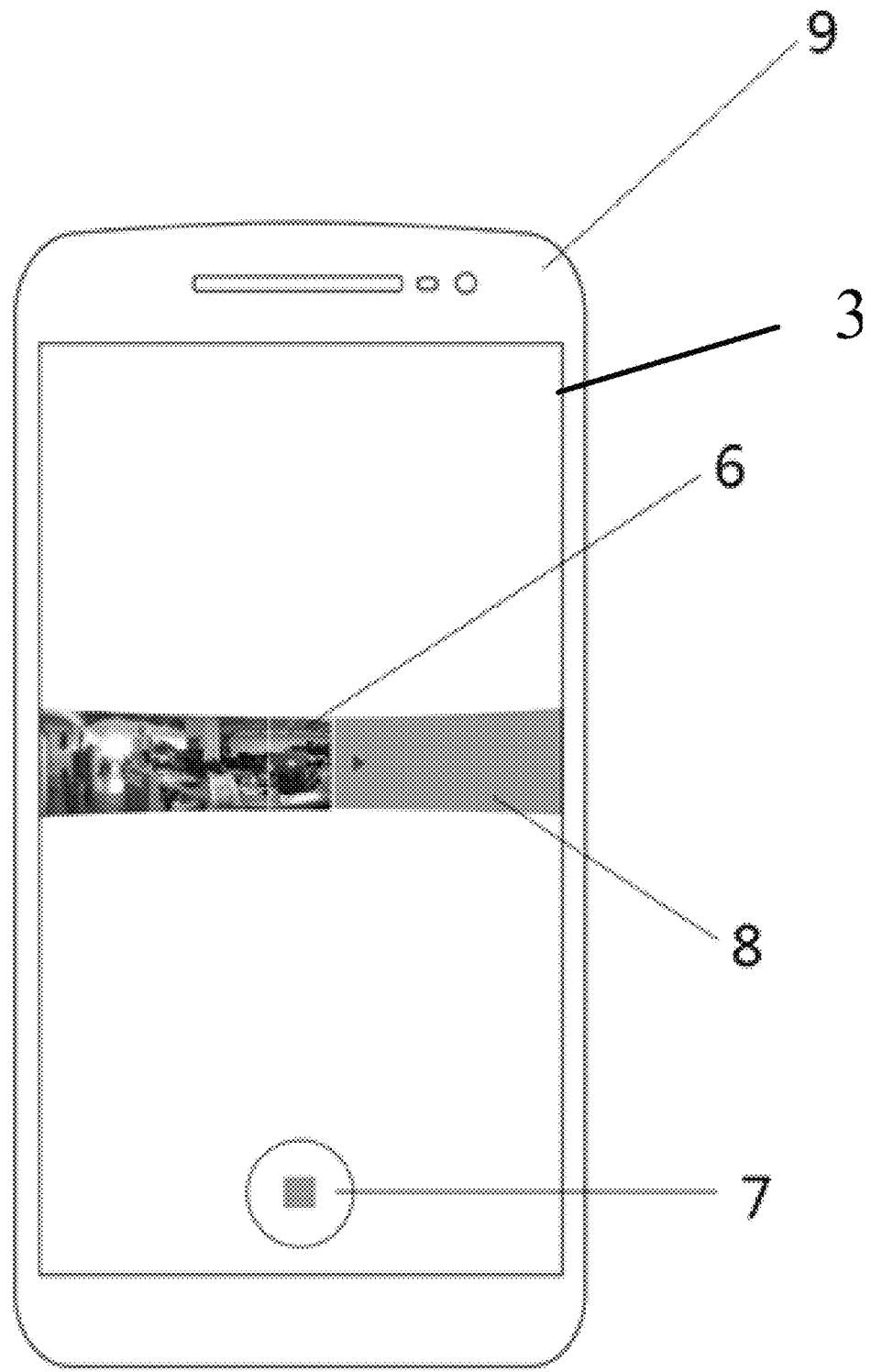
FIG. 6 illustrates a schematic view of the electronic device at another stage during acquiring the panoramic image.

Referring again to FIG. 2, at S202, at a moment Tm when the mth image is acquired, the mth image is processed to be the second indicator in the panoramic mode, and the second indicator corresponding to the mth image can be controlled to be arranged on the first side of and close to the viewfinder frame 6. FIG. 6 illustrates a schematic view of the electronic device at another stage during acquiring the panoramic image consistent. Similar to the displayed first image, the mth image is processed as the second indicator in the panoramic mode, and as shown in FIG. 6, the display of the generating process of the mth image includes displaying the gradual movement of the mth image from the first edge of the viewfinder frame 6 located on the center of the display screen 3 of the electronic device.

Further, the visual effect displayed by the electronic device includes, on the display screen 3, the gradual movement of the mth image from the left edge of the viewfinder frame 6 till the right edge of the mth image coincides with the left edge of the viewfinder frame 6. Further, the left edge of the mth image is stitched with the right edge of the (m−1)th image that appears prior to the mth image, thereby forming a wide-format image bar for display on the left side of the viewfinder frame 6.

Figure 7:
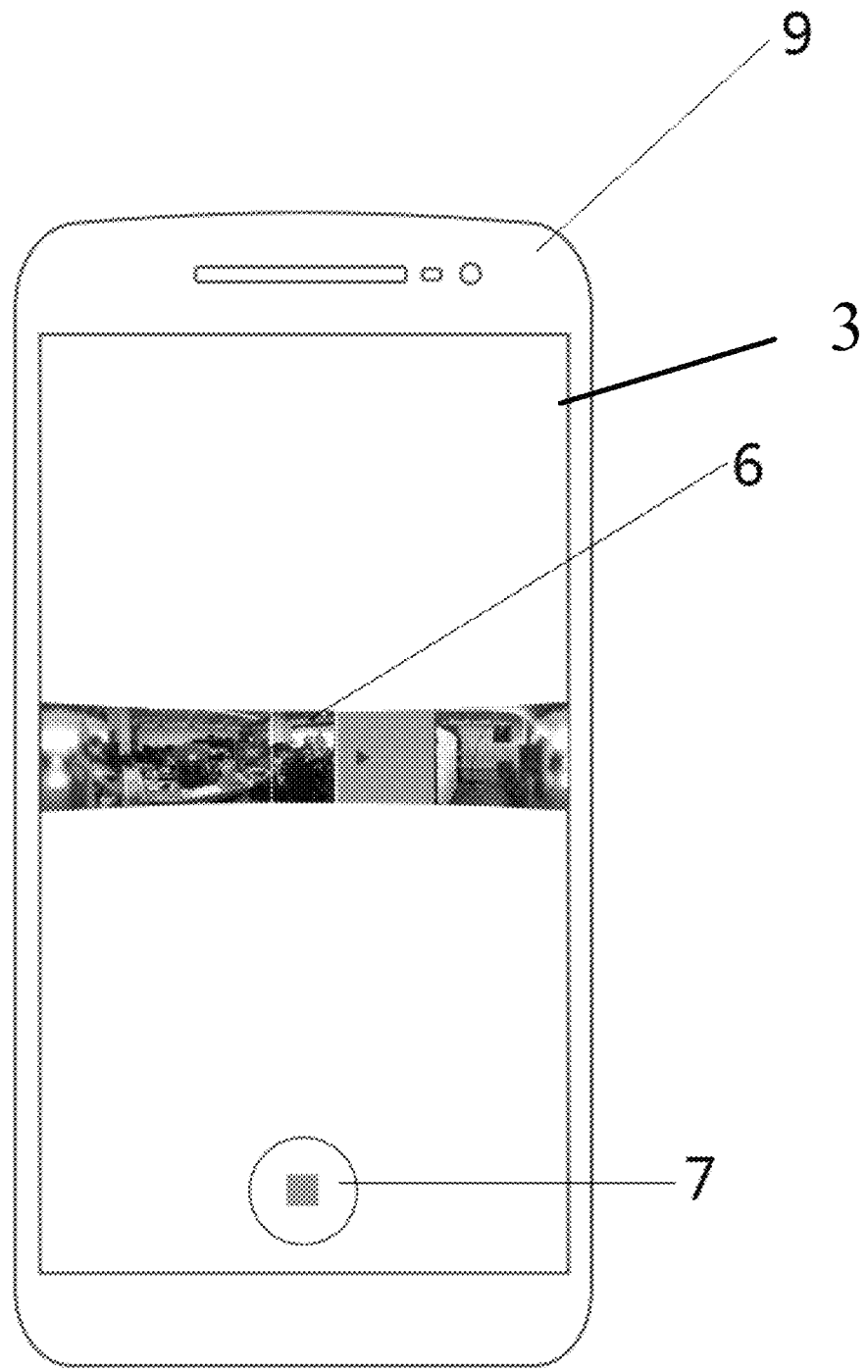
FIG. 7 illustrates a schematic view of the electronic device at another stage during acquiring the panoramic image.

Referring again to FIG. 2, at S203, at a moment Tn−k when the (n−k)th image is acquired, where k is an integer and 0<k<n, the (n−k)th image is processed to be the second indicator in the panoramic mode, and the second indicator corresponding to the (n−k)th image is controlled to be arranged on the first side of and close to the viewfinder frame 6. Further, on a second side relatively far from the viewfinder frame 6, the second indicator corresponding to the first image is arranged. Such process is similar to the process of acquiring the mth image, and is configured for displaying the generating process of the (n−k)th image. FIG. 7 illustrates a schematic view of the electronic device at another stage during acquiring the panoramic image.

As shown in FIG. 7, the (n−k)th image is gradually displayed on the left side of the viewfinder frame 6, and the visual effect displayed in the electronic device include, in the display screen 3, the gradual movement of the (n−k)th image from the left edge of the viewfinder frame 6 till the right edge of the (n−k)th image coincides with the left edge of the viewfinder frame 6. Further, the left edge of the (n−k)th image is stitched with the right edge of the (n−k−1)th image that appears prior to the (n−k)th image, thereby forming an even wider image bar for display on the left side of the viewfinder frame 6.

Further, in such progress, the second indicator corresponding to the first image is arranged on the second side of and away from the viewfinder frame 6 on the center of the display screen 3. For example, referring to FIG. 7, the second indicator corresponding to the first image is arranged to the right of the viewfinder frame 6. In some embodiments, the first image gradually appears from the right border of the display screen 3 relative to the right border of the viewfinder frame 6, and moves towards the right edge of the viewfinder frame 6. As such, a plurality of images shot by the electronic device can be gradually displayed to illustrate the forming process of the panoramic image and create the effect that the image is annular.

Further, the aforementioned first side of the viewfinder frame 6 is opposite to the second side of the viewfinder frame 6. For example, if the first side of the viewfinder frame 6 is the left side, then the second side of the viewfinder frame 6 is the right side. As another example, if the first side of the viewfinder frame 6 is the upper side, then the second side of the viewfinder frame 6 is the lower side.

Further, in the process responding to the panorama photographing command, at the moment of Tn when acquiring the nth image, the nth image is processed to be the second indicator in the panoramic mode. The second indicator corresponding to the nth image is controlled to be arranged in the viewfinder frame 6, and the second indicator corresponding to the first image is arranged on the second side of and close to the viewfinder frame 6. Further, the set of n images are saved as one panoramic image.

Figure 8:
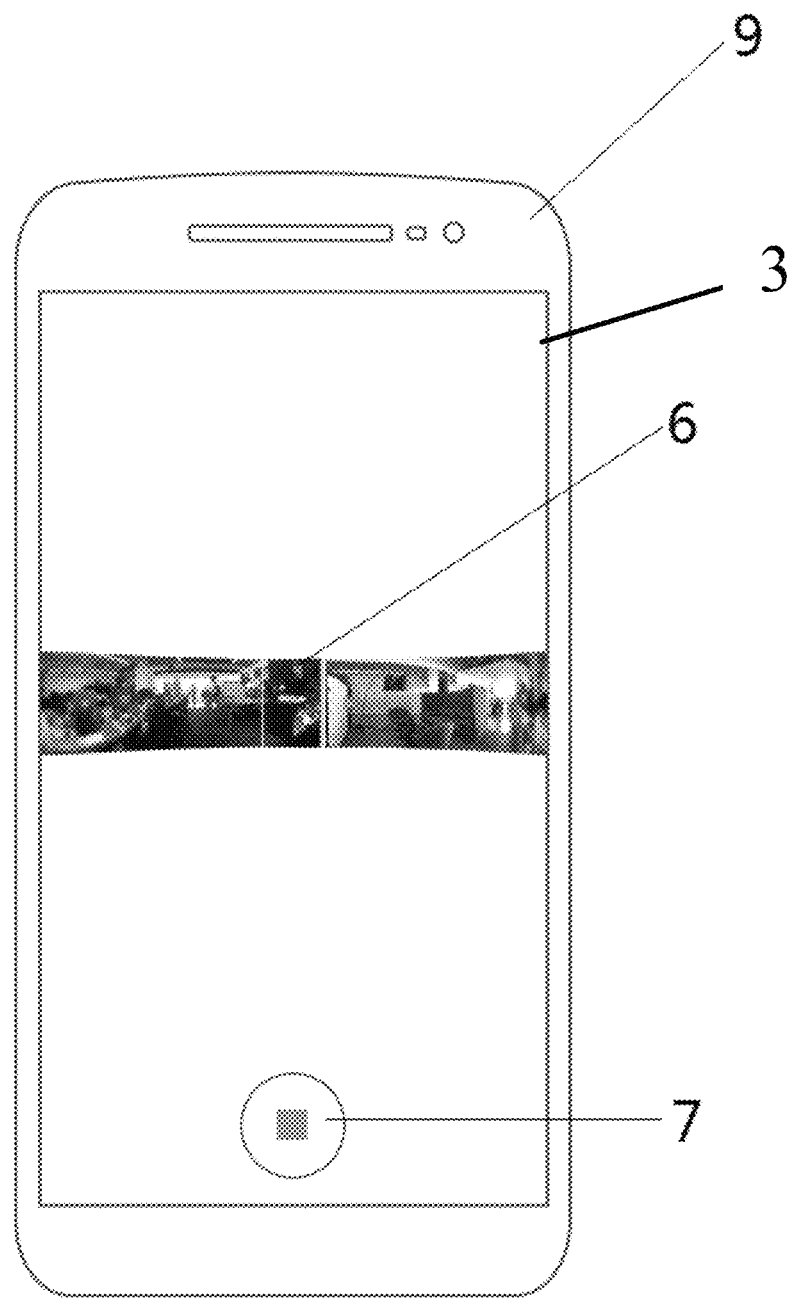
FIG. 8 illustrates a schematic view of the electronic device at another stage during acquiring the panoramic image.

FIG. 8 illustrates a schematic view of the electronic device at another stage during acquiring the panoramic image. As shown in FIG. 8, in some embodiments, when the nth image is acquired, the nth image may be displayed in the viewfinder frame 6, and the first image has gradually moved to a location where the left edge of the first image coincides with the right edge of the viewfinder frame 6. Thus, all images have been acquired, and the annular visual effect is created on the display screen 3.

Further, the panorama photographing command may include an image-saving command. In some embodiments, when the images are saved, the images may be saved gradually during the generating process of the panoramic image. For example, the right edge of the first image may be stitched to the left edge of the second image and the stitched first and second images may be saved together as a first progress image. Further, when the third image is acquired, the left edge of the third image may be stitched to the right edge of the first progress image and the stitched first, second, and third images may be saved as a second progress image. Similarly, the nth image may be acquired and the left edge of the nth image may be stitched to the (n−1)th process image and all stitched images may be saved as the panoramic image. This approaching of progressively stitching the images and saving them as the panoramic image during the process of acquiring and processing the images is also referred to as a progressive approach.

In some other embodiments, some or all of the images acquired before the nth image may not be saved before the nth image is acquired, and at the moment Tn when the nth image is acquired, the set of n images may be stitched together using the aforementioned method and saved at once as the panoramic image. For example, at the moment Tn when the nth image is acquired, the right edge of the first image may be stitched with the left edge of the second image, the right edge of the second image may be stitched with the left edge of the third image, . . . , and the right edge of the (n−1)th image may be stitched with the left edge of the nth image, and the set of n images are together saved into one panoramic image.

During the process responding to the panorama photographing command, the method further include determining whether a condition for the second indicator corresponding to the first image to be arranged on the second side of and away from the viewfinder frame 6 is satisfied. In some embodiments, whether a preset condition is satisfied may be determined during the photographing process, and once the preset condition is satisfied, the second indicator corresponding to the first image may be arranged on the second side of and away from the viewfinder frame 6.

For example, if the electronic device is rotated to capture a 360-degree panoramic image, when the electronic device is rotated for a preset angle, the first image may gradually show up on the right side of and away from the viewfinder frame 6 (located in the center of the display screen 3) on the display screen 3. In another example, if the electronic device is panned for a certain distance to capture a panoramic image, when the electronic device moves a preset distance, the first image may gradually show up on the right side of and away from the viewfinder frame 6 (located in the center of the display screen 3) on the display screen 3, as shown in FIG. 7.

In some embodiments, determining whether a condition for the second indicator corresponding to the first image to be arranged on the second side of and away from the viewfinder frame 6 may include obtaining a rotation angle of the electronic device and, when the rotation angle satisfies a preset condition, determining that the second indicator corresponding to the first image needs to be arranged on the second side of and away from the viewfinder frame 6.

In some embodiments, to obtain the annular 360-degree panoramic image, the electronic device is gradually rotated to take images with the photography spot being the center of the circle. For example, when the rotation angle is 270 degrees, the first image may gradually appear from the right side of the display screen 3. That is, when the rotation angle reaches 270 degrees, the left edge of the first image starts to appear from the display screen 3, and when the rotation angle exceeds 270 degrees, the first image gradually shows up from the right side of the display screen 3. Correspondingly, when the rotation angle is 90 degrees, the first image gradually disappears from the left side of the display screen 3. The aforementioned display mode of the images may show the annular visual effect of the panoramic image, such that the user using the electronic device may feel the gradual fading change of the image (e.g., fade-in or fade-out).

In some embodiments, determining whether a condition for the second indicator corresponding to the first image to be arranged on the second side of and away from the viewfinder frame 6 is satisfied may further include: obtaining a similarity between a currently collected image by the electronic device and the first image. For example, when the first image shows a portion of a scene and the currently collected image also shows a portion of the same scene, the currently collected image may be considered to have a certain similarity with the first image.

Further, when the similarity between the currently collected image and the first image satisfies a preset condition, there may be a need to arrange the second indicator corresponding to the first image on the second side of and away from the viewfinder frame 6. That is, the first image may need to gradually show up from the right side of the display screen 3 away from the viewfinder frame 6.

For example, although the currently collected image and the first image may each display a portion of a scene, if the scenes displayed in the currently collected image and the first image are determined to be the same, i.e., the two images are considered to be very similar to each other, the electronic device that rotates to capture the panoramic image is considered to have rotated for a large enough angle, i.e., enough images have been acquired. Then, the second indicator corresponding to the first image may need to show up on the second side of and away from the viewfinder frame 6.

In some embodiments, the method of acquiring a panoramic image further includes acquiring movement information of the electronic device. For example, based on the movement information of the electronic device, the disclosed method may determine whether the movement of the electronic device is translational or rotational.

In some embodiments, when the movement of the electronic device is a translational movement, whether the condition for the second indicator corresponding to the first image to be arranged on the second side of and away from the viewfinder frame 6 is satisfied does not need to be determined. For example, whether the rotation angle of the electronic device reaches a preset angle does not need to be determined, and the similarity between the currently collected image and the first image does not need to be determined. Such setting eliminates a determination step and improves the efficiency of image processing. In some other embodiments, when the movement of the electronic device is a rotational movement, whether the condition for the second indicator corresponding to the first image to be arranged on the second side of and away from the viewfinder frame 6 is satisfied needs to be determined.

Hereinafter, the whole process of photographing a panoramic image is illustrated in detail with reference to FIGS. 4-9. First, when the electronic device such as the cellphone 9 is utilized to shoot the panoramic image, e.g., the electronic device is moved or rotated to acquire the 360-degree panoramic image, the viewfinder frame 6 may be placed in the center of the display screen 3 of the cellphone 9.

As shown in FIG. 4, four arrows indicating the movement directions of the electronic device may be configured surrounding the viewfinder frame 6, and each arrow may indicate one of the upwards, downwards, leftwards, and rightwards directions, thereby instructing the user to rotate or move the electronic device in a certain direction to acquire images. For example, after the photographing button 7 is triggered, based on the arrow that instructs the movement direction, the cellphone 9 may rotate to the right for photographing. The viewfinder frame 6 may remain still, i.e., the position of the viewfinder frame 6 remains substantially unchanged. While the electronic device is continuously rotated to acquire images, the acquired images may gradually move from the left edge of the viewfinder frame 6 for display in the process bar 8.

Further, the left edge of a newly obtained image may be stitched with the right edge of a previously obtained image, and the stitched image may be generated towards left and form an annular visual effect near the edge of the display screen 3 of the cellphone 9. When the photographing is performed at a preset angle, e.g., 270 degrees, the first image may show up from the right side of the display screen 3 of the cellphone 9. When the photographing for the 360 degrees is close to being completed, the first image obtained at the very beginning may gradually enter the viewfinder frame 6.

Such visual processing method allows the user to feel the fading change of the image and create the annular visual effect. After the left edge of the first image and the right edge of the last image are stitched together, the panoramic image is formed.

The present disclosure provides an electronic device. The electronic device, e.g., a digital camera or a cellphone 9 with a camera for taking images or videos, is configured to photograph and generate panoramic images. It should be noted that, the panoramic image often displays a scene covering 90 degree to 360 degree (columnar panorama) onto a two-dimensional plane, thereby showing the front, the back, the left, and the right of the single scene to the observer.

Figure 3:
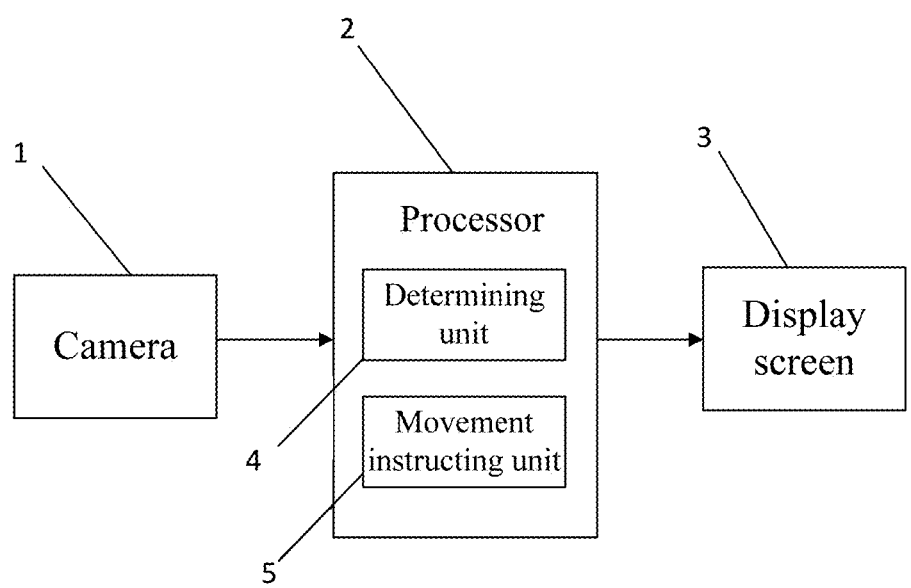
FIG. 3 illustrates a block diagram of an electronic device consistent with the disclosure.

FIG. 3 illustrates a block diagram of an example of electronic device consistent with the disclosure. As shown in FIG. 3, the electronic device may include a camera 1, a processor 2, and a display screen 3. In some embodiments, as shown in FIG. 3, the processor 2 includes a determining unit 4 and a movement instructing unit 5.

In some embodiments, the camera 1 may be configured for collecting images. The processor 2 may be coupled to the camera 1 and the display screen 3, and be configured for acquiring a panoramic mode determining command. The determining command may be sent by the processor 2, and may be triggered in an automatic manner or a manual manner.

For example, the panoramic mode determining command may be manually triggered by pressing a corresponding button, e.g., a shutter button or the photographing button 7 shown in FIGS. 4-9, in the electronic device or by utilizing a corresponding application program, thereby allowing the electronic device to receive the panoramic mode determining command.

Further, the processor 2 is configured for, based on the panoramic mode determining command, controlling the electronic device to be in the panoramic photographing mode for acquiring a panoramic image. That is, in the panoramic photographing mode, the electronic device may utilize system resources to prepare for photographing a panoramic image.

In the panoramic photographing mode, the display screen 3 of the electronic device may be controlled to display the viewfinder frame 6 and the first indicator that indicates one or more directions to move the electronic device. For example, as shown in FIG. 49, the viewfinder frame 6 may be configured in a central position of the display screen 3, and the location of the viewfinder frame 6 may not change as the electronic device moves. The viewfinder frame 6 may display an image to be shot or currently being shot for browsing by the user.

The first indicator may include one or more arrows or other indicators close to the viewfinder frame 6, and the first indicator may suggest the electronic device moving along a certain direction to shoot the next image. For example, four arrows indicating the possible movement directions of the electronic device may be configured surrounding the viewfinder frame 6, and each arrow may indicate one of the upwards, downwards, leftwards, and rightwards directions, thereby instructing the user to rotate or move the electronic device in a certain direction and photograph an image during the rotation or moving process.

For example, as shown in FIGS. 4-9, the first indicator may instruct the user to rotate the electronic device to the left or right to obtain images, and the process bar 8 is configured on the left and right sides of the viewfinder frame 6 to hold the acquired images.

The processor 2 may be further configured for acquiring a panorama photographing command, where the panorama photographing command is configured to instruct the electronic device to acquire a set of n images consecutively and save the set of n images as a panoramic image. In the process of acquiring the set of n images, in some embodiments, the electronic device may shoot one image every time it rotates a certain degree, such that the set of n images may be obtained after the number of rotation times reaches n. In some other embodiments, the electronic device may move linearly, and shoot one image every certain interval, such that a total number of n images may be obtained after a number of movement times of n. Further, the set of n images may be stitched based on the acquisition sequence, and the stitched images may be saved as a panoramic image.

In the process of responding to the panorama photographing command, the processor 2 may be further configured for, at the moment T1 when the first image is acquired, processing the first image to be a second indicator in the panoramic mode. The second indicator may be displayed in various forms for representing the photographing and processing processes of the images, referring to the whole generating progress of the panoramic image.

In one embodiment, the processor 2 may control to arrange the second indicator corresponding to the first image on a first side of the viewfinder frame 6. For example, on the left side of the viewfinder frame 6 that is located on the central region of the display screen 3 of the electronic device, the first image is gradually displayed. Further, the visual effect displayed by the electronic device includes showing the gradual movement of the first image from the left edge of the viewfinder frame 6 till the right edge of the first image coincides with the left edge of the viewfinder frame 6. As such, the second indicator corresponding to the first image can indicate the photographing process, and can prompt for photographing the second image.

At the moment Tm when the mth image is acquired, the processor 2 may be configured for processing the mth image to be the second indicator in the panoramic mode, and controlling to arrange the second indicator corresponding to the mth image on the first side of and close to the viewfinder frame 6. Similar to the first image displayed, the mth image is processed to be the second indicator in the panoramic mode, for displaying the formation process of the mth image.

For example, as shown in FIG. 6, on the left side of the viewfinder frame 6 located in the center of the display screen of the electronic device, the mth image is gradually displayed. Further, the visual effect displayed by the electronic device refers to that, on the display screen 3, the mth image gradually moves out from the left edge of the viewfinder frame 6 till the right edge of the mth image coincides with the left edge of the viewfinder frame 6. Further, the left edge of the mth image is stitched with the right edge of the (m−1)th image that appears prior to the mth image, thereby forming a wide image bar for display on the left side of the viewfinder frame 6.

At the moment Tn−k when the (n−k)th image is acquired, the processor 2 may be further configured for processing the (n−k)th image to be the second indicator in the panoramic mode. Further, the processor may be configured for controlling to arrange the second indicator corresponding to the (n−k)th image on the first side of and close to the viewfinder frame 6 and controlling to arrange the second indicator corresponding to the first image on a second side of and away from the viewfinder frame 6. Such process is similar to the process of acquiring the mth image, and is configured for displaying the generating process of the (n−k)th image.

For example, as shown in FIG. 7, the (n−k)th image is gradually displayed on the left side of the viewfinder frame 6, and the visual effect displayed in the electronic device includes, in the display screen 3, the gradual movement of the (n−k)th image from the left edge of the viewfinder frame 6 till the right edge of the (n−k)th image coincides with the left edge of the viewfinder frame 6. Further, the left edge of the (n−k)th image is stitched with the right edge of the (n−k−−1)th image that appears prior to the (n−k)th image, thereby forming an even wider image bar for display on the left side of the viewfinder frame 6.

Further, such progress arranges the second indicator corresponding to the first image on the second side of and away from the viewfinder frame 6 on the center of the display screen 3. For example, as shown in FIG. 7, the second indicator corresponding to the first image is arranged on the right side of the viewfinder frame 6. In some embodiments, the first image gradually appears from the right side of the display screen 3 relative to the right side of the viewfinder frame 6, and gradually moves towards the right edge of the viewfinder frame 6. As such, a plurality of images shot by the electronic device can be gradually displayed to illustrate the forming process of the panoramic image and create the effect that the image is annular.

Further, the aforementioned first side of the viewfinder frame 6 is opposite to the second side of the viewfinder frame 6. For example, when the first side of the viewfinder frame 6 is the left side, the second side of the viewfinder frame 6 is the right side.

In the process of responding to the panorama photographing command, the processor 2 may be further configured for, at the moment of Tn when acquiring the nth image, processing the nth image to be the second indicator in the panoramic mode, controlling to arrange the second indicator corresponding to the nth image in the viewfinder frame 6, and controlling to arrange the second indicator corresponding to the first image on the second side of and close to the viewfinder frame 6. Further, the set of n images are saved as one panoramic image.

In some embodiments, as shown in FIG. 8, when the nth image is acquired, the nth image may be displayed in the viewfinder frame 6, and the first image has gradually moved to a location where the left edge of the first image coincides with the right edge of the viewfinder frame 6. Thus, all images have been acquired, and the annular visual effect is created on the display screen 3.

Further, the panorama photographing command may include an image-saving command. In some embodiments, when the images are saved, the images may be saved gradually during the generating process of the panoramic image. For example, the right edge of the first image may be stitched to the left edge of the second image and the stitched first and second images may be saved together as a first progress image. Further, when the third image is acquired, the left edge of the third image may be stitched to the right edge of the first progress image and the stitched first, second, and third images may be saved as a second progress image. Similarly, the nth image may be acquired and the left edge of the nth image may be stitched to the (n−1)th process image and all stitched images may be saved as the panoramic image.

In some other embodiments, some or all of the images acquired before the nth image may not be saved before the nth image is acquired, and at the moment Tn when the nth image is acquired, the set of n images may be stitched together using the aforementioned method and saved as at once as the panoramic image.

Further, the determining unit 4 included in the processor 2 may, in the process of responding to the panorama photographing command, execute to determine whether a condition for the second indicator corresponding to the first image to be arranged on the second side of and away from the viewfinder frame 6 is satisfied. In some embodiments, whether a preset condition is satisfied may be determined during the photographing process, and once the preset condition is satisfied, the second indicator corresponding to the first image may be arranged on the second side of and away from the viewfinder frame 6.

For example, if the electronic device is rotated to capture a 360-degree panoramic image, when the electronic device is rotated for a preset angle, the first image may gradually show up on the right side of and away from the viewfinder frame 6 (located in the center of the display screen 3) on the display screen 3. In another example, if the electronic device is panned for a certain distance to capture a panoramic image, when the electronic device moves a preset distance, the first image may gradually show up on the right side of and away from the viewfinder frame 6 (located in the center of the display screen 3) on the display screen 3, as shown in FIG. 7.

In some embodiments, determining, by the determining unit 4, whether a condition for the second indicator corresponding to the first image to be arranged in the second side of and away from the viewfinder frame 6 is satisfied includes obtaining, by the processor 2, a rotation angle of the electronic device and, when the rotation angle satisfies the preset condition, determining that the second indicator corresponding to the first image needs to be arranged on the second side of and away from the viewfinder frame 6.

In some embodiments, to obtain the annular 360-degree panoramic image, the electronic device is gradually rotated to take images with the photography spot being the center of the circle. For example, when the rotation angle is 270 degrees, the first image may gradually appear from the right side of the display screen 3. That is, when the rotation angle reaches 270 degrees, the left edge of the first image starts to appear from the display screen 3, and when the rotation angle exceeds 270 degrees, the first image gradually shows up from the right side of the display screen 3.

Correspondingly, when the rotation angle is 90 degrees, the first image gradually disappears from the left side of the display screen 3. The aforementioned display mode of the images may show the annular visual effect of the panoramic image, such that the user using the electronic device may feel the gradual fading change of the image.

In some embodiments, determining, by the determining unit 4, whether a condition for the second indicator corresponding to the first image to be arranged in the second side of and away from the viewfinder frame 6 is satisfied may further include obtaining, by the determining unit 4, a similarity between an image currently collected by the electronic device and the first image. For example, when the first image shows a portion of a scene and the currently collected image also shows a portion of the same scene, the currently collected image may be considered to have a certain similarity with the first image.

Further, when the similarity between the currently collected image and the first image satisfies a preset condition, there may be a need to arrange the second indicator corresponding to the first image on the second side of and away from the viewfinder frame 6. That is, the first image may need to gradually show up from the right side of the display screen 3 away from the viewfinder frame 6.

For example, although the currently collected image and the first image may each display a portion of a scene, if the scenes displayed in the currently collected image and the first image are determined to be the same, i.e., the two images are considered to be very similar to each other, the electronic device that rotates to capture the panoramic image is considered to have rotated for a large enough angle, i.e., enough images have been acquired. Then, the second indicator corresponding to the first image may need to show up on the second side of and away from the viewfinder frame 6.

In some embodiments, the movement instructing unit 5 included in the processor 2 may be configured for acquiring movement information of the electronic device. Based on the movement information of the electronic device, the movement instructing unit may determine whether the movement of the electronic device is translational or rotational.

In some embodiments, when the movement of the electronic device is a translational movement, the processor 2 does not need to determine whether the condition for the second indicator corresponding to the first image to be arranged on the second side of and away from the viewfinder frame 6 is satisfied. For example, the processor 2 may not need to determine whether the rotation angle reaches a preset angle, nor does the processor 2 need to determine the similarity between the current image and the first image. Such setting eliminates a determination step and improves the efficiency of image processing.

In some other embodiments, when the movement instructing unit 5 indicates that the movement of the electronic device is rotational, a signal is sent to the processor 2, and the determining unit 4 included in the processor 2 determines whether the condition for the second indicator corresponding to the first image to be arranged on the second side of and away from the viewfinder frame 6 is satisfied.

Hereinafter, the whole process of photographing a panoramic image is illustrated in detail with reference to FIGS. 4-9. First, when the electronic device such as the cellphone 9 is utilized to shoot the panoramic image, e.g., the electronic device is rotated to acquire the 360-degree panoramic image, the viewfinder frame 6 may be placed in the center of the display screen 3 of the cellphone 9.

As shown in FIG. 4, four arrows indicating the movement directions of the electronic device may be configured surrounding the viewfinder frame 6, and each arrow may indicate one of the upwards, downwards, leftwards, and rightwards directions, thereby instructing the user to rotate or move the electronic device in a certain direction to acquire images. For example, after the photographing button 7 is triggered, based on the arrow that instructs the movement direction, the cellphone 9 may rotate to the right for photographing. The viewfinder frame 6 may remain still, i.e., the position of the viewfinder frame 6 remains unchanged. While the electronic device is continuously rotated to acquire images, the acquired images may gradually move from the left edge of the viewfinder frame 6 for display in the process bar 8.

Further, the left edge of a newly obtained image may be stitched with the right edge of a previously obtained image, and the stitched image may be generated towards left and form an annular visual effect near the edge of the display screen 3 of the cellphone 9. When the photographing is performed at a preset angle, e.g., 270 degrees, the first image may show up from the right side of the display screen 3 of the cellphone 9. When the photographing for the 360 degrees is close to being completed, the first image obtained at the very beginning may gradually enter the viewfinder frame 6.

Such visual processing method allows the user to feel the fading change of the image and create the annular visual effect. After the left edge of the first image and the right edge of the last image are stitched together, the panoramic image is formed.

Figure 10:
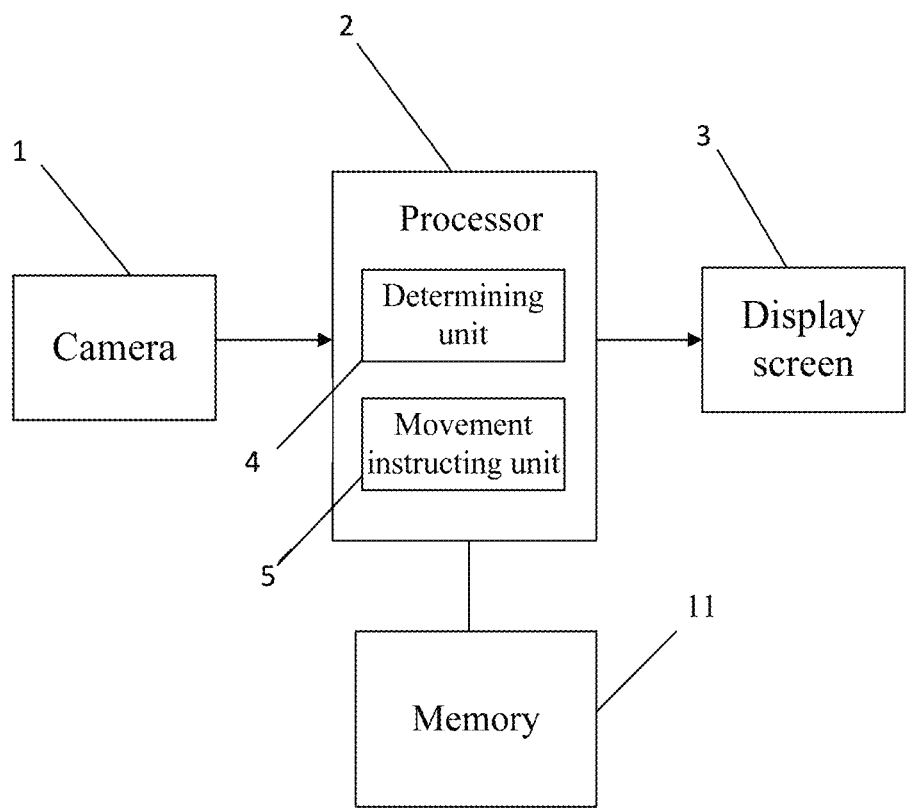
FIG. 10 illustrates a block diagram of another electronic device consistent with the disclosure.

FIG. 10 shows a block diagram of another example of electronic device consistent with the disclosure. The electronic device shown in FIG. 10 includes the camera 1, the processor 2 coupled to the camera 1, the display 3 coupled to the processor 2, and a memory 11 coupled to the processor 2. The memory 11 stores one or more computer programs or instructions for execution by the processor 2 to perform a method consistent with the disclosure, such as one of the methods described above. The memory 11 can include a non-transitory computer-readable storage medium, and can be, for example, a U disk, a removable hard disk, a read only memory (ROM), a random access memory (RAM), a floppy disk, a CD-ROM, or any other suitable medium that can store program codes.

As such, the present disclosure provides an improved panorama collecting and browsing method of a photographing application. That is, when a preset condition is satisfied, an image that is acquired first may be displayed from a side of the display screen. Further, under the situation of further rotation, more images may be displayed from the aforementioned side, so as to provide an instruction and remind the user attempting to obtain a panoramic image that the collection of the 360-degree panoramic view is going to be completed. Further, the first image and the last image are eventually stitched together when the last image is collected at 360 degrees. Accordingly, the user gains an experience of completing 360-degree rotary connection of a panorama.

In some other embodiments, in the panoramic mode of the photographing application, whether the movement of the electronic device is translational or rotational is determined to determine whether the panoramic notifying collection manner of the aforementioned rotational movement is applied, or the panoramic notifying collection manner of the translational movement is applied. The panoramic notifying collection manner of the translational movement may not display the earliest image on the other side of the screen.

Although the present disclosure is illustrated and described with reference to example embodiments of the present disclosure, those skilled in the relevant art should understand that, without departing from the spirit and scope of the present disclosure, various changes may be made to the present disclosure in the manner and detail. Therefore, the scope of the present disclosure shall not be limited to the aforementioned embodiments, or to the appended claims, but may be further determined by equivalents of the appended claims.

What is claimed is:

1. A method comprising:
controlling a display screen of an electronic device to display a viewfinder frame and a direction indicator that indicates a movement direction for the electronic device to acquire a panoramic image;
acquiring a first image and processing the first image to obtain a first progress indicator;
arranging the first progress indicator on a first side of and close to the viewfinder frame;
acquiring a second image and processing the second image to obtain a second progress indicator;
arranging the second progress indicator on the first side of and close to the viewfinder frame and moving the first progress indicator away from the viewfinder frame;
acquiring a third image and processing the third image to obtain a third progress indicator; and
arranging the third progress indicator on the first side of and close to the viewfinder frame and arranging the first progress indicator on a second side of and away from the viewfinder frame, wherein the first side is opposite to the second side.

2. The method according to claim 1, further comprising:
acquiring a fourth image and processing the fourth image to obtain a fourth progress indicator; and
arranging the fourth progress indicator in the viewfinder frame and arranging the first progress indicator on the second side of and close to the viewfinder frame.

3. The method according to claim 2, further comprising:
progressively stitching the images and saving the stitched images as the panoramic image while the images are being acquired.

4. The method according to claim 2, further comprising:
stitching the images and saving the stitched images as the panoramic image after the fourth image is acquired.

5. The method according to claim 1, further comprising, before arranging the first progress indicator on the second side of and away from the viewfinder frame:
determining whether a condition for arranging the first progress indicator on the second side of and away from the viewfinder frame is satisfied.

6. The method according to claim 5, wherein determining whether the condition is satisfied includes:
obtaining a rotation angle of the electronic device; and
determining whether the condition is satisfied based on whether the rotation angle satisfies a preset condition.

7. The method according to claim 5, wherein determining whether the condition is satisfied includes:
obtaining a similarity between the third image and the first image; and
determining whether the condition is satisfied based on whether the similarity satisfies a preset condition.

8. The method according to claim 1, further comprising:
acquiring movement information of the electronic device;
based on the movement information, determining whether a movement of the electronic device is translational or rotational; and
in response to determining that the movement of the electronic device is translational, determining whether a condition for arranging the first progress indicator on the second side of and away from the viewfinder frame is satisfied.

9. An electronic device comprising:
a camera;
a processor coupled to the camera; and
a display screen coupled to the processor,
wherein the processor:
controls the display screen to display a viewfinder frame and a direction indicator that indicates a movement direction for the electronic device to acquire a panoramic image;

acquires a first image and processes the first image to obtain a first progress indicator;

arranges the first progress indicator on a first side of and close to the viewfinder frame;

acquires a second image and processes the second image to obtain a second progress indicator;

arranges the second progress indicator on the first side of and close to the viewfinder frame and moves the first progress indicator away from the viewfinder frame;

acquires a third image and processes the third image to obtain a third progress indicator; and arranges the third progress indicator on the first side of and close to the viewfinder frame and arranges the first progress indicator on a second side of and away from the viewfinder frame, wherein the first side is opposite to the second side.

10. The electronic device according to claim 9, wherein the processor further:

acquires a fourth image and processes the fourth image to obtain a fourth progress indicator; and arranges the fourth progress indicator in the viewfinder frame and arranges the first progress indicator on the second side of and close to the viewfinder frame.

11. The electronic device according to claim 10, wherein the processor further:

progressively stitches the images and saves the stitched images as the panoramic image while the images are being acquired.

12. The electronic device according to claim 10, wherein the processor further:

stitches the images and saves the stitched images as the panoramic image after the fourth image is acquired.

13. The electronic device according to claim 9, wherein the processor further, before arranging the first progress indicator on the second side of and away from the viewfinder frame:

determines whether a condition for arranging the first progress indicator on the second side of and away from the viewfinder frame is satisfied.

14. The electronic device according to claim 13, wherein the processor further:

obtains a rotation angle of the electronic device; and determines whether the condition is satisfied based on whether the rotation angle satisfies a preset condition.

15. The electronic device according to claim 13, wherein the processor further:

obtains a similarity between the third image and the first image; and determines whether the condition is satisfied based on whether the similarity satisfies a preset condition.

16. The electronic device according to claim 9, wherein the processor further:

acquires movement information of the electronic device;

based on the movement information, determines whether a movement of the electronic device is translational or rotational; and in response to determining that the movement of the electronic device is translational, determines whether a condition for arranging the first progress indicator on the second side of and away from the viewfinder frame is satisfied.

* * * * *